May 1, 1956  E. W. McGUINESS  2,744,204
ELECTRIC COIL
Filed Oct. 25, 1950

Inventor:
Edward W. McGuiness,
by Ernest C. Britton
His Attorney.

United States Patent Office

2,744,204
Patented May 1, 1956

2,744,204

ELECTRIC COIL

Edward W. McGuiness, South Hamilton, Mass., assignor to General Electric Company, a corporation of New York Application October 25, 1950, Serial No. 191,996

5 Claims. (Cl. 310—218)

The present invention relates to coils of electric conductor wire for use in dynamoelectric machines, magnets, and other inductive apparatus, and to methods of manufacture thereof.

Previously, field coils for dynamoelectric machines have been form wound, removed from the form, covered with laminated acetate kraft paper collars, and then covered with cotton tape. Varnish treatment supplied to such coils comprised a vacuum impregnation with an asphalt type varnish followed by a second dip in a modified phenolic varnish. The varnishes were solvent-containing varnishes. This type of coil construction is such as to make penetration of the varnish into the coil structure very difficult and incomplete.

Accordingly, it is an object of my invention to provide an improved electric coil and an improved method of manufacturing the same.

Another object of the invention is to provide an improved electric coil having improved characteristics and which is easier and less costly to manufacture than coils of previously known constructions.

Another object of the invention is in the provision of an electric coil having improved heat dissipation characteristics and which requires substantially less wire conductor than in previous constructions.

Figure 1:
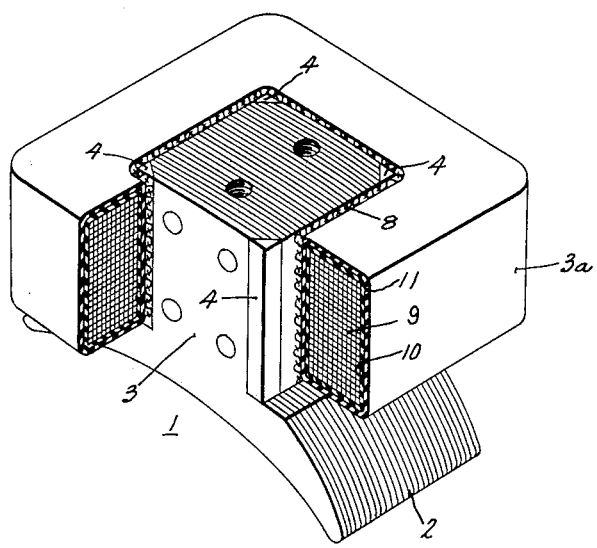
Figure 2:
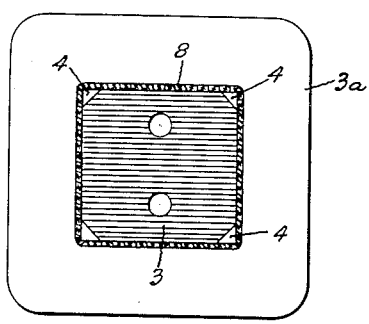
Figure 3:
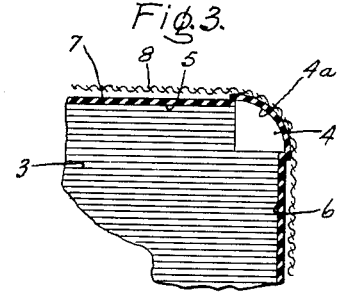

Other objects and advantages will be apparent from the following description taken in connection with the accompanying drawings in which Fig. 1 is a partially broken perspective view of a field coil for a dynamoelectric machine in accordance with the invention; Fig. 2 is an end view showing a portion of my improved coil construction and looking along the axis of the coil; and Fig. 3 is an enlarged detailed view illustrating one of the features of the coil construction.

Referring now to the drawings, a pole piece for a dynamoelectric machine is illustrated generally at 1 having a shoe portion 2 and a core portion 3. As illustrated, pole piece 1 is of laminated construction well-known to those skilled in the art. However, the invention is not limited to a laminated type of core construction, my improved coil arrangement being equally applicable for use with a solid metallic core. In my improved coil construction, a bundle of wire comprising the coil proper is wound directly on the metallic core portion 3. Since sharp edges occurring at the corner portions of core portion 3 would produce a harmful effect on the conductor wire forming the coil, it is desirable to provide means for avoiding this harmful action. This is accomplished in accordance with the invention by cutting away the corner portions of core portion 3 to receive spacer members 4. For reasons which will appear presently, spacer members or wedges 4 should be constructed of a material which is substantially unaffected by heat at temperatures of the order of 250° C. For example, wedges or spacer members 4 may be constructed of wood. Spacer members 4 may have an exposed surface which is curved, as indicated clearly in Fig. 3, to avoid sharp corners being in contact with the conductor wires which form the coil. Also indicated in Fig. 3, the curved surface 4a of spacer member 4 extends slightly beyond laminations to absorb the force of the conductor wires during the winding operation. In order to illustrate this feature with clarity, Fig. 3 is greatly enlarged and perhaps somewhat distorted with respect to Figs. 1 and 2. It is intended that any deformation of spacer member 4 which takes place as a result of the force exerted by the wire during the winding operation will result in the sides 5, 6 of core portion 3 being substantially flush with curved surface 4a of spacer members 4 after the coil is wound. Spacer members 4 are secured to core portion 3 in any convenient manner.

Before winding the coil, a shell or coating 7 of insulating material is applied directly to the metallic core portion 3 and spacer members 4. The manner in which insulating shell 7 is applied and the composition thereof will be described hereinafter. Additional insulation is provided in the form of a mat 8 surrounding the insulation shell 7. Insulation mat 8 is made of a sheet or film of woven material which is non-hygroscopic, such as glass cloth or glass mat, and may be either resin treated or untreated. In addition to providing additional insulation, mat 8 acts as a spacer member between the coil and the insulated core portion 3 and wedges or spacer members 4.

The coil portion 3a is formed from compactly wound conductor wire 9 in the form of a bundle. The wire bundle 9 is enclosed by a first shell 10 of a polymerized resin the composition of which and the manner in which said shell is secured to the wire bundle will be given hereinafter. Shell 10 is likewise enclosed by a second shell 11 the composition of which and the manner of securing the same to shell 10 will also be given as the description proceeds.

In the manufacture of my improved coil structure, the use of cotton tape, acetate collars, and solvent containing varnishes is eliminated. A metal pole piece is first cleaned to remove any grease. Wooden wedges or spaced members 4 are placed in the cut-away section of the pole piece at the four corners thereof, as illustrated in Fig. 3. It will be appreciated, however, that if the core portion is provided with a radius instead of a sharp corner, the wooden wedges can be omitted. The pole piece, including spacer members 4, is then heated to a temperature sufficient to cause film formation when the pole piece is immersed in a heat convertible plastisol. The preheated pole piece is then immersed in a heat convertible plastisol, following which it is transferred to an oven where it is subjected to heat for a sufficiently long period to convert the liquid plastisol into a tough insulating shell 7 surrounding the metallic pole piece 1 and the wooden wedge or spacer members 4.

One such heat convertible plastisol which has been suitable for use in the construction of my improved coils is more particularly described in a copending application of John A. Loritsch and Patrick DiCerbo, Serial No. 15,746, filed March 18, 1948, now issued as U. S. Patent No. 2,567,719 and assigned to the assignee of the present application.

Excellent results have been obtained by preheating the pole piece to approximately 185° C., then giving it a 10-second immersion in the permafil, followed by a one hour bake in an oven at approximately 190° C.

The metal pole piece which now has insulating film 7 thereon is then placed on a suitable winding form. A piece of non-hygroscopic sheet of woven material, such a glass cloth or glass mat, either resin treated or untreated, is then wrapped around the insulating shell 7. If desired, the mat of non-hygroscopic material may be made long enough so that the ends thereof can be folded over the end portions of the completed coil to give additional protection thereto. The coil is then compactly wound on the insulated pole piece and over the non-hygroscopic material so that said material acts as a spacer between the coils of wire and the insulated pole piece.

The entire coil structure is then impregnated with a liquid polymerizable heat convertible resin by subjecting the entire coil structure, including the pole piece, to a well known type of vacuum treatment to insure thorough impregnation of the entire coil structure, or, if desired, the entire coil structure may merely be immersed in such a resin. Such a polymerizable resin which has been used with good results is of the following composition:

| | Parts |
|---|---|
| H. H. Robertson Stypol Resin 102 (mixture of unsaturated alkyd resin and styrene, known generally as unsaturated polyester resins) | 100 |
| Talc | 20 |
| Santocel C (silica aerogel) | 3 |
| 100 mesh Formvar (reaction product of an aldehyde, particularly formaldehyde, and a partially hydrolyzed polyvinyl acetate) | 2 |
| Catalyst comprising 50 parts benzoyl peroxide and 50 parts tricresyl phosphate | 2 |

After the coil structure has been thoroughly impregnated, the coil is removed to a baking oven where it is allowed to remain long enough for the polymerizable resin to be converted into a hard, strong matrix in which the coil parts are embedded. When the above-described resin is employed, I have found that a two hour oven bake at 125° C. will produce a hard, strong matrix structure. Following the polymerization process, the entire coil structure is then immersed hot into a heat convertible plastisol, such as is more particularly described in the aforementioned patent to Loritsch et al., for 20 seconds and then given a 15 minute cure at 125° C. followed by a one hour cure at 190° C.

Tests indicate that my improved coil structure, which is obtained by winding a coil directly on an insulated pole piece, gives a much improved rate of heat dissipation through the pole piece of a field coil to the frame of a dynamoelectric machine. In addition, there is also a substantial saving in copper, which results from the shorter mean length of turn of conductor wire.

While a particular embodiment of the invention has been illustrated and described, it will be obvious to those skilled in the art that various changes and modifications can be made without departing from the invention and it is intended in the appended claims to cover all such changes and modifications that fall within the true spirit and scope of the invention.

What I claim as new and desire to secure by Letters Patent of the United States is:

1. A salient pole construction for a dynamoelectric machine comprising a metal core of substantially rectangular cross section, a coating of heat convertible plastisol covering said core, a winding constructed and arranged to encircle said plastisol covered core to insure intimate contact between substantially the full inner periphery of said winding and said core to thereby provide maximum heat conduction therebetween, and means protecting said winding from injury at the corners of said core.

2. A salient pole construction for a dynamoelectric machine comprising a metal core of substantially rectangular cross section and having recessed corners, a plurality of insulating spacers respectively positioned in said recessed corner, a coating of heat convertible plastisol covering said core and said spacers, and a winding constructed and arranged to encircle said plastisol covered core in intimate contact therewith throughout substantially their full common periphery to provide the maximum heat conduction between said winding and said core.

3. A salient pole construction for a dynamoelectric machine comprising a metal core of substantially rectangular cross section and having recessed corners, a plurality of spacers respectively positioned in said corners, said spacers substantially completing the rectangular configuration of said core and providing curved corners for said rectangular configuration, a coating of heat convertible plastisol covering said core and said spacers, and a winding constructed and arranged to encircle said plastisol covered core in intimate contact therewith, throughout substantially their full common periphery to provide the maximum heat conduction between said winding and said core.

4. A salient pole construction for a dynamoelectric machine comprising a rectangular-sectioned metal core, a coating of heat convertible plastisol covering said core, a winding constructed and arranged to encircle said plastisol coated core in intimate contact therewith throughout substantially their full common periphery to provide the maximum heat conduction between said winding and said core, said winding being impregnated with a hardened solventless varnish to eliminate all voids therein and encased in a heat convertible plastisol integrally joined to the plastisol coating of said core.

5. A salient pole construction for a dynamoelectric machine comprising a metal core of substantially rectangular cross section and having recesses at each corner, a plurality of insulating spacers respectively positioned in said recesses to substantially complete the rectangular configuration of said core and providing curved corners for said rectangular core, a coating of heat convertible plastisol on said core, a non-hygroscopic glass mat surrounding said plastisol coated core, and a winding constructed and arranged to encircle said glass mat in intimate contact therewith throughout substantially their full common periphery, said winding being impregnated with a hardened solventless varnish to fill all voids therein and encased in a heat convertible plastisol integrally connected to the plastisol coating of said core to form a unitary core and coil construction.

References Cited in the file of this patent

UNITED STATES PATENTS

| 2,315,654 | Putman | Apr. 6, 1943 |
| 2,422,591 | Sigmund et al. | June 17, 1947 |
| 2,456,219 | Shaheen | Dec. 14, 1948 |
| 2,464,029 | Ehrman | Mar. 8, 1949 |
| 2,473,842 | Askey | June 21, 1949 |
| 2,484,215 | Foster | Oct. 11, 1949 |
| 2,486,751 | McMichael | Nov. 1, 1949 |
| 2,549,309 | Hill et al. | Apr. 17, 1951 |
| 2,567,719 | Loritsch et al. | Sept. 11, 1951 |

FOREIGN PATENTS

| 500,298 | Great Britain | Feb. 7, 1939 |